(12) United States Patent
Skog et al.

(10) Patent No.: US 9,369,378 B2
(45) Date of Patent: Jun. 14, 2016

(54) ENABLING IP-COMMUNICATION WITH A MACHINE TO MACHINE UNIT

(75) Inventors: Robert Skog, Hässelby (SE); Andreas Ljunggren, Vällingby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 288 days.

(21) Appl. No.: 14/000,810

(22) PCT Filed: Feb. 25, 2011

(86) PCT No.: PCT/SE2011/050216
§ 371 (c)(1),
(2), (4) Date: Aug. 21, 2013

(87) PCT Pub. No.: WO2012/115551
PCT Pub. Date: Aug. 30, 2012

(65) Prior Publication Data
US 2013/0332627 A1   Dec. 12, 2013

(51) Int. Cl.
*G06F 15/173* (2006.01)
*H04L 12/717* (2013.01)
(Continued)

(52) U.S. Cl.
CPC .............. *H04L 45/42* (2013.01); *H04L 61/106* (2013.01); *H04L 61/2038* (2013.01);
(Continued)

(58) Field of Classification Search
CPC ..... H04L 45/42; H04L 61/10; H04L 61/2038; H04L 61/2076; H04L 61/605; H04L 61/6054; H04W 4/005; H04W 4/14; H04W 76/045
USPC ......... 709/213, 223, 224, 227, 228, 230, 237, 709/244
See application file for complete search history.

(56) References Cited

U.S. PATENT DOCUMENTS 6,526,131 B1 *   2/2003   Zimmerman et al. ... 379/106.09
6,785,724 B1 *   8/2004   Drainville et al. ............ 709/227
(Continued)

FOREIGN PATENT DOCUMENTS

CN          101860807 A     10/2010
WO    WO 2006038094 A1     4/2006
(Continued)

OTHER PUBLICATIONS

International Search Report, PCT/SE2011/050216 mailed Nov. 14, 2011.
(Continued)

*Primary Examiner* — Liangche A Wang
*Assistant Examiner* — Johnny Aguiar
(74) *Attorney, Agent, or Firm* — Patent Portfolio Builders, PLLC

(57) ABSTRACT

A Proxy Unit is connectable to a communication network and is arranged to enable IP Communication with a Machine to Machine Unit. The Proxy Unit receives and stores in a session data base a first IP address a device identifier and a unique ID of the Machine to Machine Unit. The Proxy Unit then receives from a Machine to Machine application a message destined to the Machine to Machine Unit and comprising the unique ID of the Machine to Machine Unit. The Proxy Unit finds the associated device identifier and the first IP address in the session data base, using the received unique ID. If the Proxy Unit detects no active session for the Machine to Machine Unit, it uses the device identifier to send a wake up message to the Machine to Machine Unit for enabling IP communication.

13 Claims, 6 Drawing Sheets

(51) Int. Cl.
   *H04L 29/12* (2006.01)
   *H04W 4/00* (2009.01)
   *H04W 76/04* (2009.01)
   *H04W 4/14* (2009.01)

(52) U.S. Cl.
   CPC ......... *H04L 61/2076* (2013.01); *H04L 61/605* (2013.01); *H04L 61/6054* (2013.01); *H04W 4/005* (2013.01); *H04W 76/045* (2013.01); *H04W 4/14* (2013.01)

(56) References Cited

U.S. PATENT DOCUMENTS

| | | | |
|---|---|---|---|
| 6,859,135 B1* | 2/2005 | Elliott | 340/7.36 |
| 2001/0028636 A1 | 10/2001 | Skog et al. | |
| 2007/0025301 A1* | 2/2007 | Petersson | H04L 47/10 370/338 |
| 2008/0137823 A1 | 6/2008 | Abichandani et al. | |
| 2008/0233922 A1 | 9/2008 | Lesrel | |
| 2008/0313255 A1* | 12/2008 | Geltner et al. | 709/201 |
| 2009/0077184 A1* | 3/2009 | Brewer et al. | 709/206 |
| 2009/0077249 A1* | 3/2009 | Chen | 709/229 |
| 2009/0268712 A1* | 10/2009 | Bottiero et al. | 370/352 |
| 2010/0077023 A1* | 3/2010 | Eriksson | 709/203 |
| 2011/0249636 A1* | 10/2011 | Cherian et al. | 370/329 |

FOREIGN PATENT DOCUMENTS

| | | |
|---|---|---|
| WO | WO 2006088947 A2 | 8/2006 |
| WO | WO 2007/059628 A1 | 5/2007 |

OTHER PUBLICATIONS

International Search Report, PCT/SE2011/050222, Jun. 29, 2011.
Written Opinion of the International Searching Authority, PCT Application No. PCT/SE2011/050216, Nov. 14, 2011, 5pp.
International Preliminary Report on Patentability, PCT Application No. PCT/SE2011/050216, Aug. 27, 2013, 5pp.

\* cited by examiner

ENABLING IP-COMMUNICATION WITH A MACHINE TO MACHINE UNIT

CROSS REFERENCE TO RELATED APPLICATION

This application is a 35 U.S.C. §371 national stage application of PCT International Application No. PCT/SE2011/050216, filed on 25 Feb. 2011, the disclosure and content of which is incorporated by reference herein in its entirety. The above-referenced PCT International Application was published in the English language as International Publication No. WO 2012/115551 A1 on 30 Aug. 2012.

TECHNICAL FIELD

The present invention relates to enabling IP-communication with a Machine to Machine Unit, and in particular to method and apparatus for a Proxy Unit in a communication network for enabling IP Communication with a Machine to Machine Unit.

BACKGROUND

Machine to Machine (M2M) is a technology that supports wired or wireless communication between devices, and wireless M2M is applicable to all wireless network technologies such as GSM, GPRS, UMTS and LTE. Examples of the use of M2M communication include sensor networks (for example, networks for monitoring weather conditions), surveillance equipment (for example alarm systems or video monitoring), vehicle fleet management, vending machines, and monitoring manufacturing.

An M2M device is typically provided with a SIM card, and uses the Internet Protocol (IP) for communicating with other devices, allowing for example utility companies to automatically read utility meters, which eliminates the need for personnel to visit customer premises and manually read meters. M2M communications may also be used e.g. for alarm reporting and remote control applications.

In order for the M2M device to communicate via IP with other devices in the cellular network, the M2M device attaches to the network and establishes a PDP (Package Data Protocol) context. Generally, a PDP context is the term used in the 3GPP (Third Generation Partnership Project) when IP connectivity is established between a node comprising a SIM card, e.g. an M2M device or a mobile telephone, and a 3GPP connectivity node, e.g. a GGSN node.

It is predicted that in the long term future, there may be billions of M2M devices, and that the number of M2M devices could exceed the number of mobile telephones and personal computers.

The wide scale introduction of M2M devices in mobile networks will change network traffic profiles and traffic volumes and there is a risk to overload the network. In order to avoid overload, the M2M devices could e.g. exchange data with the cellular network only for a predetermined period, or at a specific time and date. Thereby, the M2M devices could sit silently for potentially long periods, wake up for sending data, and then go back to sleep mode.

However, when an M2M device enters sleep mode, it releases the PDP context and it is no longer reachable via IP (Internet Protocol) communication. This leads to that IP devices are not able to send any messages to an M2M device being in sleep mode.

Hereinafter, the above-described M2M Device will be referred to as an M2M Unit.

SUMMARY

It is an object of the embodiments described hereinafter to address at least some of the issues outlined above, and this object and others are achieved by the method and the arrangement according to the appended independent claims, and by the embodiments according to the dependent claims.

According to a first exemplary aspect, a method is provided for a Proxy Unit in a communication network of enabling IP Communication with a Machine to Machine Unit. The method comprises receiving from a Connectivity Unit a first IP address and a device identifier of the Machine to Machine Unit. The Proxy Unit further stores the first IP address and the device identifier in a session database and receives from the Machine to Machine Unit a first message or request comprising a unique ID of the Machine to Machine Unit, the message destined to a Machine to Machine application. The Proxy Unit further stores the unique ID in the session database in association with the first IP address and the device identifier. Next, the Proxy Unit receives from the Machine to Machine application a second message destined to the Machine to Machine Unit and comprising the unique ID of the Machine to Machine Unit. The Proxy Unit then finds the associated device identifier and the first IP address in the session data base, using the received unique ID. Next, if the Proxy Unit detects no active IP-session for the Machine to Machine Unit, then the device identifier is used to send a wake up message to the Machine to Machine Unit for enabling IP communication.

Optionally, the detection of no active session comprises the Proxy unit attempting to forward the second message to the Machine to Machine Unit using the first IP address and the Unique ID of the Machine to Machine Unit and receiving a negative acknowledgment in return.

Optionally, the enabling of the IP communication comprises storing in the session data base in association with the device identifier and the unique ID a second IP address of the Machine to Machine Unit, received from the connectivity unit.

As an option, the device identifier comprises one of the MSISDN, the IMEI or the IMSI of the Machine to Machine Unit.

The detection of no active IP session may further comprise deleting the first IP address from the session data base.

As an option, the second message is forwarded to the Machine to Machine Unit using the second IP address and the unique ID.

Further, the Proxy Unit may extract the unique ID from the first message or request.

The Proxy Unit may receive a Get-message from the Machine to Machine Unit when the IP communication is enabled.

According to a second exemplary aspect, a Proxy Unit is provided that is connectable to a communication network and arranged to enable IP Communication with a Machine to Machine Unit. The Proxy Unit comprises a first receiver for receiving from a Connectivity Unit a first IP address and a device identifier of the Machine to Machine Unit, and a first storing unit for storing the first IP address and the device identifier in a session database. The Proxy Unit further comprises a second receiver for receiving from the Machine to Machine Unit a first message or request comprising a unique ID of the Machine to Machine Unit, the message destined to a Machine to Machine application. The Proxy Unit further comprises a second storing unit for storing the unique ID in the session database in association with the first IP address and the device identifier. The Proxy Unit also comprises a third receiver for receiving from a Machine to Machine application a second message destined to the Machine to Machine Unit and comprising the unique ID of the Machine to Machine Unit. The Proxy Unit further comprises a first processor unit for searching for the associated device identifier and the first IP address in the session data base, using the received unique ID, and a first sender for sending a wake up message to the Machine to Machine unit for enabling IP communication, using the device identifier, if detecting that no active IP session exists for the Machine to Machine Unit.

Optionally, the Proxy Unit further comprises a second sender for attempting to forward the second message to the Machine to Machine Unit using the first IP address and the Unique ID of the Machine to Machine Unit wherein no active IP session is detected if a negative acknowledgement is received in return.

Optionally, the Proxy Unit is arranged to store a second IP address of the Machine to Machine Unit in the session data base in association with the device identifier and the unique ID for enabling IP communication, the second IP address being received from the Connectivity unit.

The Proxy Unit may further be arranged to delete the first IP address from the session data base, if detecting no active IP session.

As an option, the Proxy Unit comprises a third sender for forwarding the second message to the Machine to Machine Unit, using the second IP address and the unique ID.

The Proxy Unit may further be arranged to extract the unique ID from the first message or request.

As an option, the request is a register request including the unique ID.

The unique ID may comprise a URI, an RFID or a serial number.

Optionally, the Proxy Unit comprises a fourth receiver for receiving a Get-message from the Machine to Machine Unit when the IP communication is enabled.

An advantage with the invention is to utilize the Proxy Unit for enabling IP communication with an M2M Unit that has entered a sleep mode. Further, M2M applications are able to send messages to the M2M Units without the need to notice in advance the status of the M2M Unit.

BRIEF DESCRIPTION OF THE DRAWINGS

Exemplary embodiments of the invention will now be described in more detail, and with reference to the accompanying drawings, in which.

DETAILED DESCRIPTION

Figure 1:
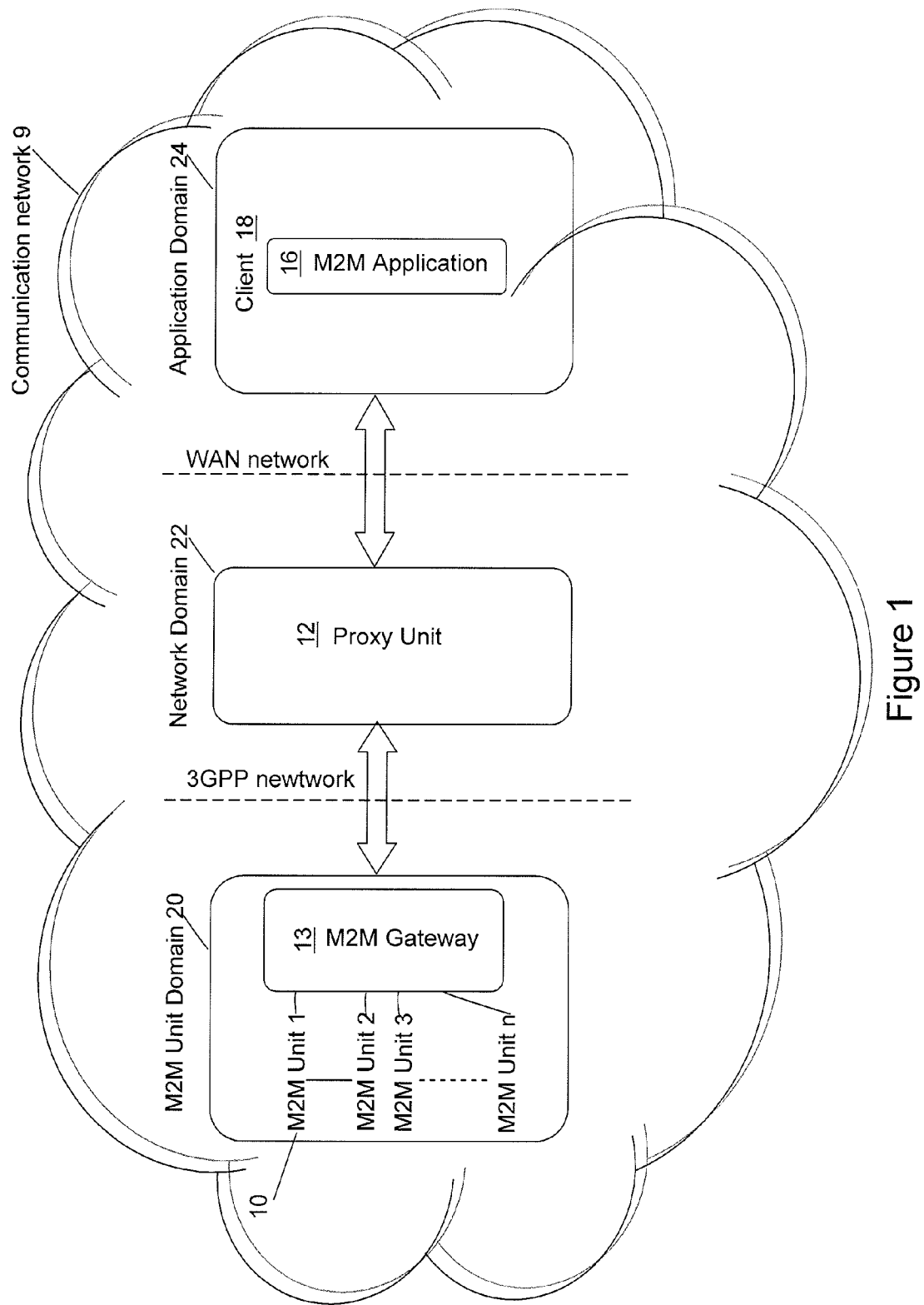
FIG. 1 schematically illustrates a first exemplary architecture of an M2M Unit implementation in a communication network.

In the following description, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it is apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

It is a concept of exemplary embodiments described hereinafter to enable IP communication with an M2M Unit 10.

M2M Units are similar to cellular user equipments in that they are equipped with a physical SIM-card or with a soft SIM-card but differs in that they can sit silently for potentially long periods, wake up for sending data or messages and then go back to sleep mode. For example, a temperature M2M Unit may be configured to send data only when the temperature is changed in the environment. Another example is an electricity meter M2M Unit that may be configured to send electrical measurement data periodically.

An M2M Unit uses IP communication to interact with end devices. An example of an end device can be any of user equipment or computer in a communication network having IP capabilities.

Hereinafter, the above-described end devices will be referred to as clients.

The clients may have a suitable interface or application that provides support for IP-communication with the M2M Units, e.g. a client may have an M2M application installed in order to interact and to communicate with the M2M Units.

The interaction between the clients and the M2M Units comprises exchanging messages between the devices, e.g. a measurement M2M Unit may send a message to the M2M application installed in a client when new data is measured and an M2M application may send a message to a measurement M2M Unit ordering it to report a specific measurement or to enter sleep mode.

The M2M application of a client communicates with the M2M Unit using a unique resource identifier (URI) with the addition of a unique ID of the M2M Unit. The unique ID can be any type of value that uniquely identifies the M2M Unit, e.g. a unique number, a unique serial number or a unique radio frequency identifier. The M2M Application uses the unique ID of the M2M Unit it would like to interact with and uses that ID as an identifier to reach and to communicate with the M2M Unit.

If an exemplary M2M Application would like to interact with a temperature M2M Unit, it may issue a URI e.g. as follows: http://m2m.operator.net/uniqueID47/temperator. The URI includes the unique ID of the M2M Unit, which in this example is 47, and the M2M application in the example wants to receive information about the temperature where the M2M Unit is located.

The core of the M2M architecture is formed by a Proxy Unit, which provides the interface between a wide are network (WAN), e.g. the Internet, and a 3GPP network. For example an M2M Unit may communicate with an M2M application by connecting to a WAN network via a 3GPP network, and all message exchanges between the M2M Unit and the M2M application will go through the Proxy Unit.

FIG. 1 schematically illustrates an exemplary communication network for enabling IP communication with an M2M Unit.

The communication network 9 comprises three main domains, an M2M Unit domain 20, a Network domain 22 and an Application domain 24.

The M2M Units 10 in the M2M Unit domain 20 can optionally be connected to an M2M gateway 13. The M2M gateway 13 or the M2M Units 10 are then connected to the Proxy Unit 12 in the Network domain 22 via a 3GPP network.

The Proxy Unit 12 in the Network domain is connected to the Application domain 24 via a WAN network, e.g. the Internet. The Client 18 in the Application domain 24 uses an M2M application 16 in the Client 18 to communicate with the M2M Units 10 using IP-communication.

With this type of setup for an M2M Unit 10, and when it has an active IP-session, the M2M Unit is able to communicate using the Internet Protocol and to exchange data and messages with the M2M application 16.

However, when the M2M Unit 10 has no active IP-session, e.g. the M2M Unit 10 is in sleep mode and has no IP address, the clients are not able to send any data or messages to it.

Figure 2:
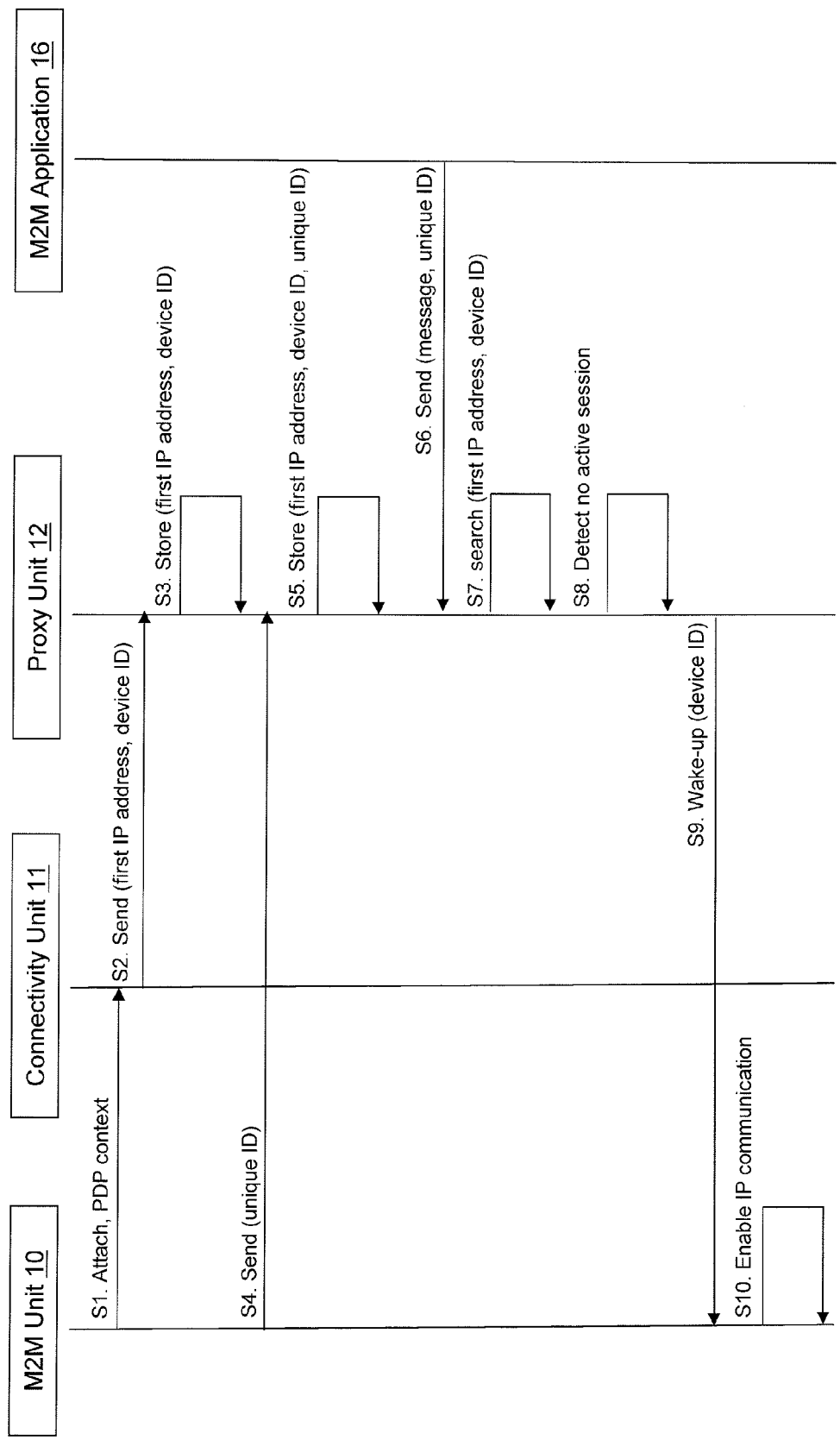
FIG. 2 illustrates an exemplary signalling diagram of enabling IP communication for an M2M Unit.

The procedure to enable IP communication with an M2M Unit 10 so that clients can send data or messages is illustrated schematically in the exemplary signalling diagram in FIG. 2, in which an M2M Unit 10, a Connectivity Unit 11, a Proxy Unit 12 and an M2M application 16 are shown. In this signaling diagram, the following steps occur:

S1. The M2M Unit 10 sends a conventional attach request to the Connectivity Unit 11, e.g. a GGSN node, to activate a PDP context, in S1.

S2. The Connectivity Unit 11 receives the attach request and activates a PDP context for the M2M Unit 10, i.e. assigns an IP address to the M2M Unit 10. The Connectivity Unit 11 is aware of the device ID, e.g. the IMSI (International Mobile Subscriber Identity), the IMEI (International Mobile Equipment Identity) or the MSISDN (Mobile Subscriber Integrated Services Digital Network Number) of the M2M Unit 10 which can be fetched from the attach request. The Connectivity Unit 11 is also aware of the IP address that has been assigned to the M2M Unit 10. The Device ID as well as the IP address is sent to the Proxy Unit 12 by the Connectivity Unit 11, in S2.

The Connectivity Unit 11 is responsible for assigning a new IP address to the M2M Unit 10 every time the M2M Unit 10 wakes up and issues an attach request. A newly assigned IP address may be equal to a previously assigned IP address or it may be a new IP address that is not the same as the previously assigned one. In FIG. 2, it is assumed that this is the first time an M2M Unit 10 attaches to the network and issues an attach request. Thus, the assigned IP address is referred to as the first IP address.

Figure 6:
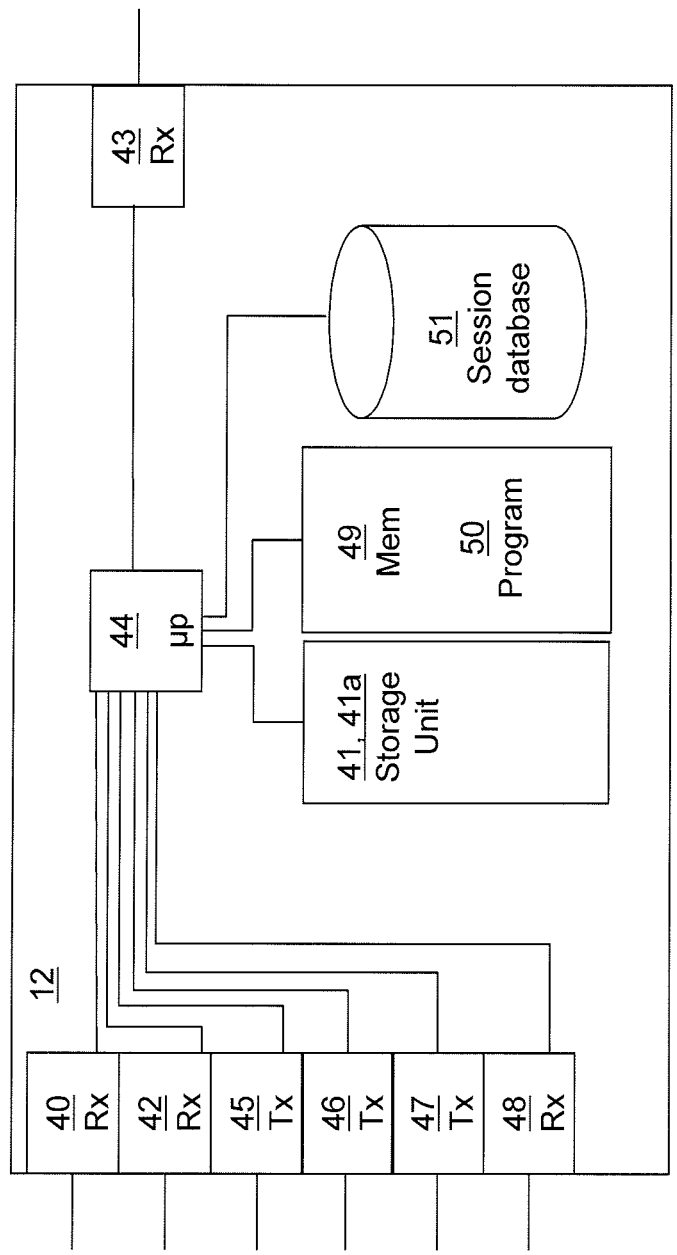
FIG. 6 schematically illustrates an exemplary Proxy Unit.

S3. The Proxy Unit 12 receives, in S3, from the Connectivity Unit 11 the device ID as well as the IP address of the M2M Unit 10 and saves this information in a session data base 51, in S3. The session database 51 is illustrated in FIG. 6. An example of such record stored in the session data base 51 is listed in the table below.

| IP address | device ID | unique ID |
|---|---|---|
| 192.1.1.1 | +46712345678 | |

The IP address listed in the table, i.e. 192.1.1.1, is an IPv4 address. However, the IP address may be any unique address for addressing the M2M Unit 10, e.g. an IPv6 address. The device ID listed in the table, i.e. +46712345678 is a MSISDN number. However, the IMSI or the IMEI of the M2M Unit can also be used as a device ID.

S4. The M2M Unit 10 having an activated PDP context may register with the Proxy Unit 12 and communicate with the M2M application 16 via the Proxy Unit 10. In S4, the M2M Unit 10 may send a register request to the Proxy Unit 12 or a message destined to the M2M application 16 via the Proxy Unit 12. The register request as well as the message includes the unique ID of the M2M Unit 10. A register request is usually sent by the M2M Unit 10 to the Proxy Unit 12 if it is the first time the M2M Unit 10 communicates with the Proxy Unit 10.

S5. The Proxy Unit 12 receives a message or a register request from the M2M Unit 10 and extracts the IP address as well as the unique ID of the M2M Unit 10 from the received message or from the received register request The extracted IP address is used by the Proxy Unit 12 to find the right row in the table that corresponds to the extracted IP address. The table stored in the session data base 51 is then updated by the Proxy Unit by adding the extracted unique ID, in S5. An example of such record stored in the session data base 51 is listed in the updated table below.

| IP address | device ID | unique ID |
|---|---|---|
| 192.1.1.1 | +46712345678 | 47 |

The unique ID in the updated table, i.e. 47, is a number that uniquely identifies the M2M Unit 10. However, the unique ID may be any unique value that may be used to uniquely identify the M2M Unit 10, e.g. a unique number, an URI, a unique serial number or a unique radio frequency identifier.

The M2M Unit will at a certain time enter sleep mode due to e.g. that it does not have to send any messages for a predefined time or to save memory etc. Once the M2M Unit 10 enters sleep mode, it releases its PDP context and will have no IP address. However, the information stored in the table including the IP address, the device ID and the unique ID will still remain in the session data base 51 in the Proxy Unit 12.

S6. As the M2M application 16 does not keep track of the current status of the M2M Unit 10, e.g. whether the M2M Unit 10 is in sleep mode or not, the M2M application 16 may at any time send a message to the M2M Unit 10, e.g. the M2M application may ask the M2M Unit 10 to report a specific measurement. In S6, a message is sent to the M2M Unit 10 via the Proxy Unit 12. The M2M application will send the message using the unique ID of the M2M Unit 10.

S7. When the Proxy Unit 12 receives the message intended for the M2M Unit, it fetches the unique ID from it and finds, in S7, the corresponding row stored in the session data base 51, as illustrated in the table above. The corresponding row contains the IP address, the device ID and the unique ID of the M2M Unit 10. The Proxy Unit 12 then uses the IP address and the unique ID of the M2M unit 10 to reach and to forward the message to the M2M Unit 10. If the M2M Unit 10 still has an active PDP context such that IP communication is possible, e.g. has not yet entered sleep mode, the message will be forwarded.

S8. However, if the M2M Unit is in sleep mode, the message will not arrive since the M2M Unit 10 does not have any IP address. The Proxy Unit 12 may be notified about the actual status of the M2M Unit, e.g. whether the M2M Unit 10 is in sleep mode or not, by receiving either a positive or a negative acknowledgments of the forwarded message. Alternatively, the Connectivity Unit 11 can notify the Proxy Unit 12 about the actual status of the M2M Unit 10, e.g. that the M2M Unit 10 has released its PDP context. If the Proxy Unit 12 in S8 detects no active IP session for the M2M Unit 10 it will update the table by deleting the IP address of the M2M Unit 10 since it is not considered to be e.g. valid, active or existing. An example of such record stored in the session data base 51 is listed in the updated table below.

| IP address | device ID | unique ID |
|---|---|---|
|  | +46712345678 | 47 |

S9. The Proxy Unit 12 then uses the unique ID received in the message sent by the M2M application 16 to find the corresponding device ID stored in the session database. The device ID is then used by the Proxy Unit 12 to send a wake up message e.g. by sending a SMS message or a wap push message to the M2M unit 10, in S9. The message alerts the M2M Unit 10 to wake up and to attach to the network for enabling IP communication.

S10. The M2M Unit 10 receives the wake up message and attaches to the network, in S10, in order to communicate and to receive messages using the IP protocol.

Figure 3:
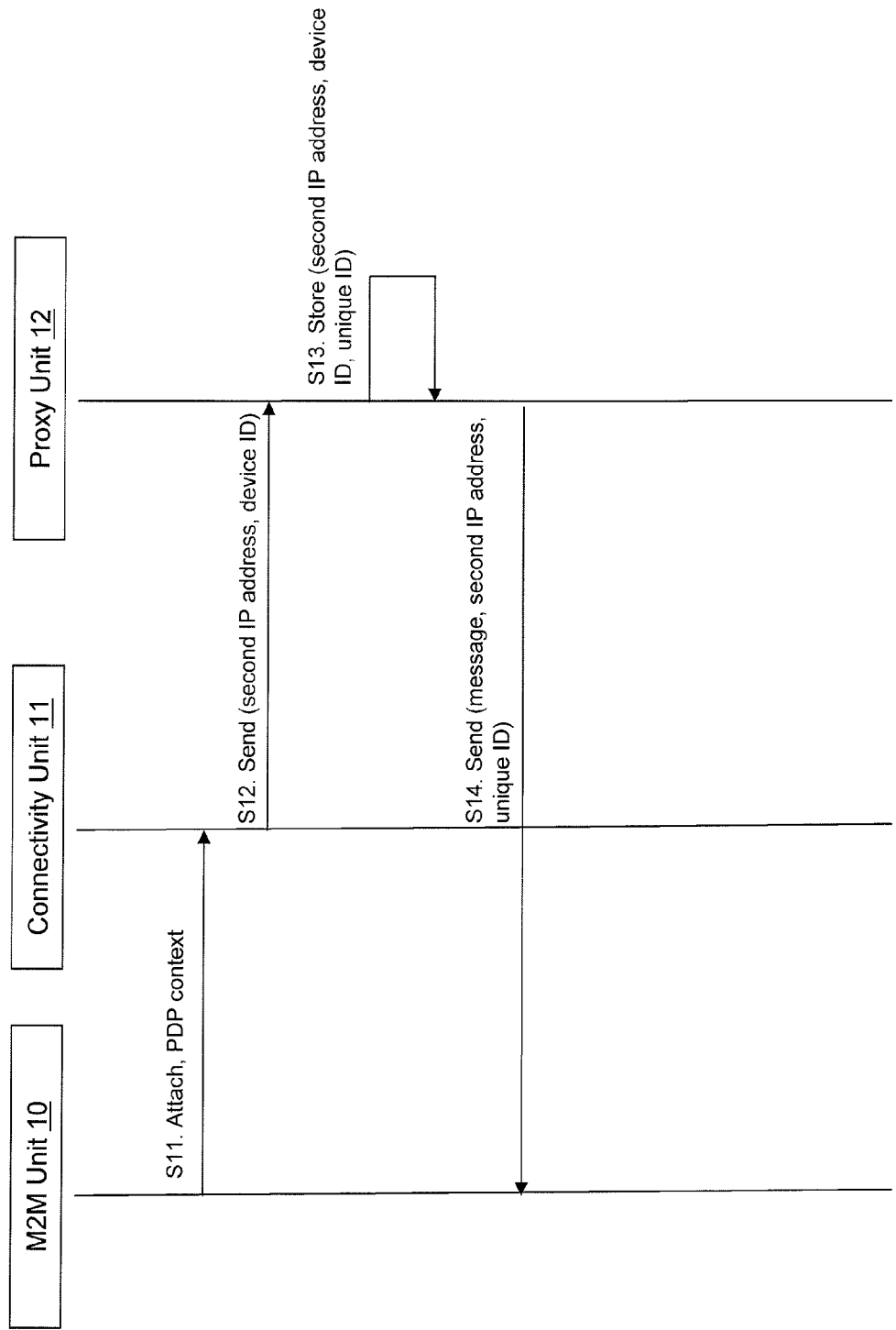
FIG. 3 illustrates a second exemplary signalling diagram of forwarding a message to an M2M Unit.

The consecutive procedure for attaching to the network as well as receiving messages is illustrated schematically in the exemplary signalling diagram in FIG. 3, in which an M2M Unit 10, a Connectivity Unit 11, a Proxy Unit 12 are shown. In this signaling diagram the following steps occur:

S11. The M2M Unit 10 wakes up according to the received wake up message and sends an attach request to the Connectivity Unit 11, in S11.

S12. The Connectivity Unit 11 receives the attach request and activates a PDP context for the M2M Unit 10. The Connectivity Unit 11 assigns a second IP address to the M2M Unit 10 and sends the second IP address as well as the device ID to the Proxy Unit 12, in S12.

S13. The Proxy Unit 12 receives the second IP address and the device ID of the M2M Unit 10 and uses the device ID to find the corresponding row in the session data base 51. The Proxy Unit 12 will then add, in S13, the second IP address into the row. An example of such record stored in the session data base 51 is listed in the updated table below.

| IP address | device ID | unique ID |
|---|---|---|
| 192.1.1.2 | +46712345678 | 47 |

S14. The Proxy Unit 12 uses the unique ID and the second IP address to forward the message (S6 in FIG. 2) received from the M2M application 16 to the M2M Unit 10, in S14. Alternatively, the M2M Unit 10 may issue a Get request to the Proxy Unit 12 asking for the message.

Figure 4:
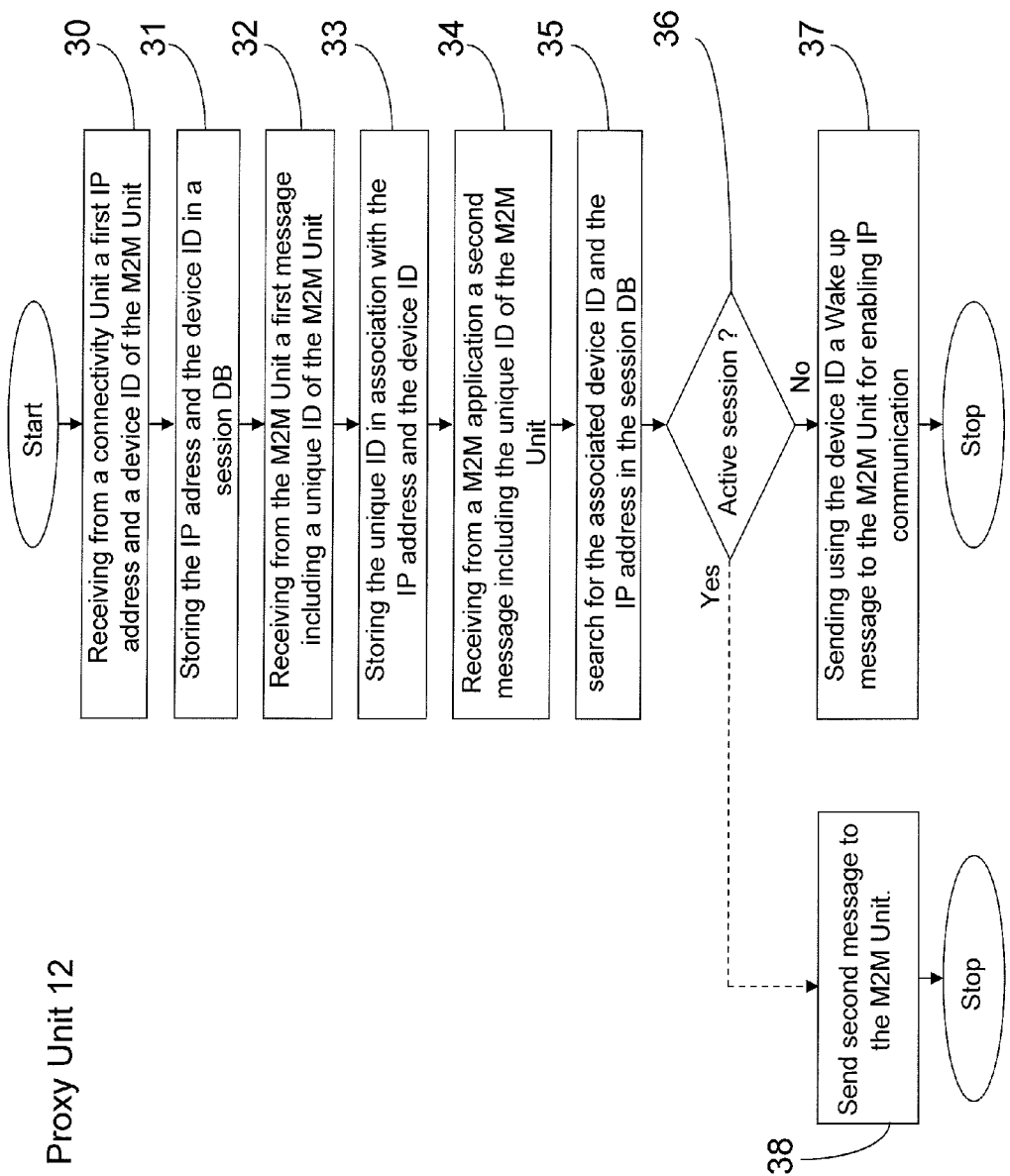
FIG. 4 illustrates schematically an exemplary flow diagram of enabling IP communication with an M2M Unit.

FIG. 4 is a flow diagram illustrating exemplary embodiments of a method for a Proxy Unit in a communication network for enabling IP communication with an M2M Unit. In the description and in the appended claims, the "first message" is a message sent from the M2M Unit and destined to the M2M application, and the "second message" is a consecutive message, which is sent from the M2M application and destined to the M2M Unit.

In step 30, the Connectivity Unit has assigned a first IP address to the M2M Unit and sends the assigned first IP address together with the device ID of the M2M Unit to the Proxy Unit. The Proxy Unit then stores in a session data base 51 the received information form the Connectivity Unit, i.e. the first IP address and the device ID of the M2M Unit, step 31. In step 32 the Proxy Unit receives a register request or a first message from the M2M Unit, and the register request or the message comprises the unique ID of the M2M Unit. The Proxy Unit stores the received unique ID in association with the first IP address and the device ID, in step 33. The Proxy Unit then receives in step 34 a second message from an M2M application to be forwarded to the M2M Unit, and the second message includes the unique ID of the M2M Unit. The unique ID included in the second message is used in step 35 by the Proxy Unit to find the associated device ID and the first IP address in the session data base 51. The Proxy Unit searches in the table for the first IP address and the unique ID to forward the second message. The Proxy Unit detects in step 36 whether or not the M2M Unit has an active IP session e.g. by receiving a positive or a negative acknowledgment or by detecting that no IP address exists in the table, i.e. the Proxy Unit has previously deleted the first IP address due to a previous notification received from the Connectivity Unit informing that no PDP context exists for the M2M Unit. If the Proxy Unit has an active session, then the second message is successfully forwarded, in step 38. If the Proxy Unit detects no active IP session, then the Proxy Unit sends in step 37 a wake up message to the M2M Unit ordering it to wake up and to attach to the network for enabling IP communication.

Figure 5:
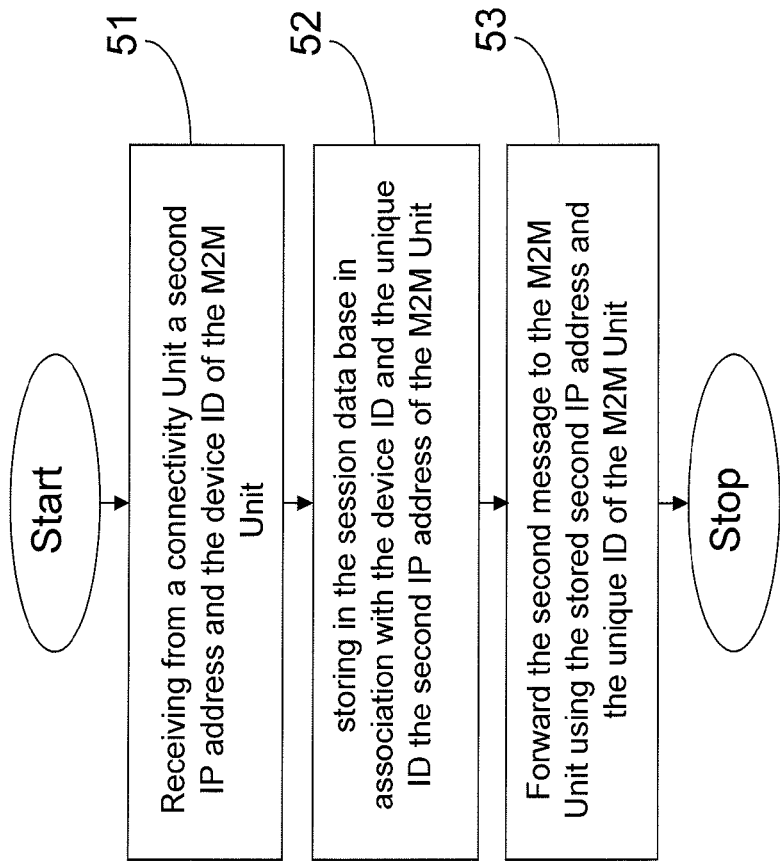
FIG. 5 illustrates schematically an exemplary flow diagram of forwarding a message to an M2M Unit.

FIG. 5 is a second flow diagram illustrating exemplary embodiments of a method for a Proxy Unit 12 in a communication network for enabling IP communication with an M2M Unit 10. In step 51, the Connectivity Unit has assigned a second IP address to the M2M Unit and sends the assigned second IP address together with the device ID of the M2M Unit to the Proxy Unit. The Proxy Unit receives and stores the second IP address in association with the device ID and the unique ID of the M2M Unit, in step 52. In step 53 the Proxy Unit forwards the second message derived from the M2M application and destined to the M2M unit using the second IP address and the unique ID of the M2M Unit.

FIG. 6 schematically illustrates a Proxy Unit 12, according to exemplary embodiments. The Proxy Unit is provided with a first receiver 40 for receiving from the Connectivity Unit a first IP address and a device identifier of the M2M Unit. The Proxy Unit also comprises a first storing unit 41 for storing the received first IP address and the device identifier in a session database 51. However, according to an alternative embodiment (not illustrated in the figure), the session database 51 is located outside the Proxy unit.

The Proxy Unit is further arranged with a second receiver 42 for receiving from the M2M Unit a first message comprising a unique ID of the M2M Unit and a second storing unit 41a for storing the unique ID in the session database 51 in association with the first IP address and the device identifier. A third receiver 43 in the Proxy Unit is further arranged for receiving from an M2M application a second message comprising the unique ID of the M2M Unit and a first processor 44 for searching, using the unique ID, the associated device ID and the first IP address. The Proxy Unit is also provided with a first sender 45 for sending a wake up message to the M2M Unit for enabling IP communication, using the device ID, if detecting that no active session exists for the M2M Unit.

According to an exemplary embodiment, the Proxy Unit further comprises a second sender 46 for attempting to forward the second data packet to the M2M Unit using the first IP address and the unique ID of the M2M Unit wherein no active session is detected if a negative acknowledgment is received in return.

According to another exemplary embodiment, the Proxy Unit is further arranged to store a second IP address of the M2M Unit in the session data base 51 in association with the device identifier and the unique ID for enabling IP communication, the second IP address being received from the connectivity unit.

According to yet another exemplary embodiment, the Proxy Unit is further arranged to delete the first IP address from the session data base 51, if detecting no active session.

According to yet another exemplary embodiment, the Proxy Unit further comprises a third sender 47 for forwarding the second data packet to the M2M Unit, using the second IP address and the unique ID.

According to yet another exemplary embodiment, the Proxy Unit further comprises a fourth receiver 48 for receiving a Get message from the M2M Unit when the IP communication is enabled.

The receivers and transmitters can be embodied in one or more physical receiver and transmitters, or in one or more transceivers. A computer readable medium is adapted in the form of a memory 49 on which may be stored a computer program 50 which when run using the processor 44 causes the M2M Unit 10 to behave as described above.

Thus, as implied above, it should be noted that the Proxy Unit 12, as illustrated in FIG. 6 may be implemented by physical or logical entities using software functioning in conjunction with a programmed microprocessor or general purpose computer, and/or using an application specific integrated circuit (ASIC). They may further include suitable internal and external storage devices, as well as appropriate communication interfaces, including hardware and software capable of performing the necessary modulating, coding, filtering and the like, as well as demodulating and decoding to process such signals.

It is an advantage with the embodiments to utilize the Proxy Unit to enable IP communication with an M2M Unit that has entered a sleep mode. Further, M2M applications are able to send messages to the M2M Units without the need to notice in advance the status of the M2M Unit.

However, the above mentioned and described embodiments are only given as examples and should not be limiting to the present invention. Other solutions, uses, objectives, and functions within the scope of the invention as claimed in the accompanying patent claims should be apparent for the person skilled in the art.

ABBREVIATIONS

GSM Global System for Mobile Communications
GPRS General Packet Radio Service
IMSI International Mobile Subscriber Identity
IP Internet Protocol
IMEI International Mobile Equipment Identity
LTE Long Term Evolution
M2M Machine to Machine
MSISDN Mobile Subscriber Integrated Services Digital Network Number
PDP Packet Data Protocol
RADIUS Remote Authentication Dial In User Service
GGSN Gateway GPRS Support Node
UMTS Universal Mobile Telecommunications System
URI Uniform Resource Identifier
WAN Wide Area Network
3GPP Third Generation Partnership Project

The invention claimed is:

1. A method for a Proxy Unit in a communication network of enabling IP Communication with a Machine to Machine Unit, the method comprising:
   receiving from a Connectivity Unit a first IP address and a device identifier of the Machine to Machine Unit, wherein the Connectivity Unit is a Gateway GPRS Support Node (GGSN);
   storing the first IP address and the device identifier in a session database;
   receiving from the Machine to Machine Unit a first message or a request comprising a unique ID of the Machine to Machine Unit, wherein the first message is destined to a Machine to Machine application;
   storing the unique ID from the first message in the session database in association with the first IP address and the device identifier;
   receiving from the Machine to Machine application a second message destined to the Machine to Machine Unit and comprising the unique ID of the Machine to Machine Unit;
   searching for the device identifier and the first IP address in the session database, using the unique ID from the second message;
   responsive to detecting no active IP-session for the Machine to Machine Unit, using the device identifier to send a wake up message to the Machine to Machine Unit for enabling IP communication, wherein the detection of no active IP-session comprises attempting to forward the second message to the Machine to Machine Unit using the first IP address and the unique ID of the Machine to Machine Unit and receiving a negative acknowledgment in return,
   wherein the enabling of the IP communication comprises storing in the session database, in association with the device identifier and the unique ID, a second IP address of the Machine to Machine Unit received from the Connectivity Unit,
   wherein detecting no active IP-session further comprises deleting the first IP address from the session database,
   wherein the second message is forwarded to the Machine to Machine Unit using the second IP address and the unique ID, and
   wherein the wake up message is sent as an SMS or a wap-push message.

2. The method according to claim 1, wherein the device identifier comprises one of MSISDN, IMEI or IMSI of the Machine to Machine Unit.

3. The method according to claim 1, wherein the Proxy Unit extracts the unique ID from the first message or the request.

4. The method according to claim 1, wherein the request is a register request including the unique ID.

5. The method according to claim 1, wherein the unique ID comprises a URI, an RFID or a serial number.

6. The method according to claim 1, further comprising the Proxy Unit receiving a Get-message from the Machine to Machine Unit when the IP communication is enabled.

7. A computer program, comprising a computer readable medium storing computer readable code which, when run on a Proxy Unit, causes the Proxy Unit to perform a method as claimed in claim 1.

8. A Proxy Unit connectable to a communication network and arranged to enable IP Communication with a Machine to Machine Unit, the Proxy Unit comprising:
   a first receiver for receiving from a Connectivity Unit a first IP address and a device identifier of the Machine to Machine Unit, wherein the Connectivity Unit is a Gateway GPRS Support Node (GGSN);

a first storing unit for storing the first IP address and the device identifier in a session database;

a second receiver for receiving from the Machine to Machine Unit a first message or a request comprising a unique ID of the Machine to Machine Unit, the first message destined to a Machine to Machine application;

a second storing unit for storing the unique ID from the first message or request in the session database in association with the first IP address and the device identifier;

a third receiver for receiving from a Machine to Machine application a second message destined to the Machine to Machine Unit and comprising the unique ID of the Machine to Machine Unit;

a first processor unit for searching for the device identifier and the first IP address in the session database, using the received unique ID from the second message;

a first sender for sending a wake up message to the Machine to Machine unit for enabling IP communication, using the device identifier, responsive to detecting that no active IP-session exists for the Machine to Machine Unit;

a second sender for attempting to forward the second message to the Machine to Machine Unit using the first IP address and the unique ID of the Machine to Machine Unit wherein no active IP-session is detected if a negative acknowledgement is received in return, the Proxy Unit being arranged to store a second IP address of the Machine to Machine Unit in the session database in association with the device identifier and the unique ID for enabling IP communication, the second IP address being received from the Connectivity Unit;

the Proxy Unit being further arranged to delete the first IP address from the session database, responsive to detecting no active IP-session; and a third sender for forwarding the second message to the Machine to Machine Unit, using the second IP address and the unique ID, wherein the wake up message is sent as a SMS or a wap-push message.

9. The Proxy Unit according to claim 8, wherein the device identifier comprises one of MSISDN, IMEI or IMSI of the Machine to Machine Unit.

10. The Proxy Unit according to claim 8, further arranged to extract the unique ID from the first message or request.

11. The Proxy Unit according to claim 8, wherein the first message or request received by the second receiver is a register request including the unique ID.

12. The Proxy Unit according to claim 8, wherein the unique ID comprises a URI, an RFID or a serial number.

13. The Proxy Unit according to claim 8, further comprising a fourth receiver for receiving a Get-message from the Machine to Machine Unit when the IP communication is enabled.

* * * * *